UNITED STATES PATENT OFFICE.

CHARLES BERNADAC, OF PARIS, FRANCE.

MANUFACTURE OF NITROCELLULOSE-AND-CASEIN COMPOUNDS.

SPECIFICATION forming part of Letters Patent No. 700,471, dated May 20, 1902.

Application filed February 4, 1902. Serial No. 92,712. (No specimens.)

*To all whom it may concern:*

Be it known that I, CHARLES BERNADAC, a citizen of the French Republic, residing in Paris, France, have invented certain new and useful Improvements in the Manufacture of Nitrocellulose-and-Casein Compounds, of which the following is a specification.

Among the materials employed as substitutes for or in lieu of shell, ivory, horn, bone, and the like the most important are those having a nitrocellulose base, and which are known under the names of "celluloid" and "xylonite," and those having a casein base and known as "lactite," "lactoid," and "gallolithe."

Notwithstanding the improvements in the manufacture, the cost-price of celluloid is still very high, and this is the greatest obstacle to its more general use. Thus, for example, it is easy to produce a celluloid in perfect imitation of bone and horn; but the price is too high and does not admit of its being used in place of natural products. The products with casein base can be manufactured cheaper than those with nitrocellulose base; but as they are always more or less liable to break and become more so with age their use is rather limited.

After numerous experiments I have succeeded in the manufacture of a new material having a base of casein and nitrocellulose at a much lower cost price than celluloid, which latter it can replace in all its applications because it has the same qualities. It is flexible, very hard without being brittle, impermeable to water. It may be sawed, turned, filed, and carved without difficulty. At a temperature of 90° to 100° centigrade it becomes very plastic and can be molded with ease. If pure casein is employed for manufacturing the new compound, the final product will be transparent, with a slightly cream-colored appearance. With non-purified casein a translucent product is obtained, which may be colored at will by an addition of coloring-matter either of organic or a mineral nature, and in this manner horn, coral, bone, &c., can be easily imitated.

At first sight the manufacture of a compound with a nitrocellulose-and-casein base would not seem to present any difficulties; but as the solvents of casein are incapable of acting on nitrocellulose, and, again, the solving liquids of nitrocellulose do not dissolve casein, it is not at all easy to obtain a perfectly homogeneous mixture of the two substances. If, for example, an attempt is made to incorporate directly the nitrocellulose rendered plastic by the addition of one of its solvents (a solution of camphor in alohol, for example) with casein, the final product will be found to be far from homogeneous, notwithstanding a prolonged kneading operation in rollers or other mixing apparatus. This final product is an imperfect mixture of casein and celluloid. Each grain of casein, although embedded in a cover of celluloid, remains permeable to water, and the compound thus obtained is found unfit for industrial purposes.

I have been able by employing the following process to manufacture a perfectly homogeneous material of which the composition may vary from one hundred to three hundred parts of casein to one hundred parts of nitrocellulose and of which the manufacturing price will be more or less nearer that of products of casein base, according to the proportions of nitrocellulose and casein introduced.

To obtain a perfect nitrocellulose-and-casein mixture, these two substances are first rendered plastic, as before mentioned, the nitrocellulose being, as in the manufacture of celluloid, treated with a solution of camphor in alcohol. For one hundred kilos of nitrocellulose forty to sixty kilos of camphor in alcohol of 95° to 96° may be employed.

For casein two different methods may be adopted.

(*a*) Casein is immersed for twenty-four to twenty-eight hours in a solution of borax in water, (one to five kilos of borax in one hundred kilos of water.) Instead of borax carbonate of soda or any other substance capable of dissolving casein may be employed. During the immersion the casein swells and becomes plastic and at the end of twenty-four to twenty-eight hours the mass is dried and then plunged in alcohol, which displaces part of the water absorbed by the casein, while nevertheless leaving it in its physical state. Instead of alcohol either methylic alcohol, acetone, sulfuric ether, or acetic acid may be employed, or, indeed, any other liquid or mixture of liquids capable of dissolving nitrocellulose. After immersion for several hours the excess of the liquid is separated from the mass of casein by pressing or in some other appropriate manner, and this mass is then ready to be incorporated in the mass of nitrocellulose prepared in the manner previously stated.

(b) Another method of operating for forming the casein into a plastic mass is as follows: A solution of borax or another substance acting as a solvent for the casein is added in part to a solution of three to ten parts of alcohol or other liquid capable of dissolving the nitrocellulose. In the liquid mixture the casein is immersed for twenty-four or twenty-eight hours, as previously stated, and is then pressed and dried.

When treating casein freshly precipitated from the milk, the procedure will be, as stated in paragraph b, by taking care to dry the casein before immersing it in the liquid, as before described.

The two substances, casein and nitrocellulose, thus prepared can now be easily mixed together in rollers and kneaders or apparatus of a similar kind. I prefer generally to employ laminating-rollers for this work. Laminating rollers or cylinders adapted to be heated and cooled similar to those employed in the manufacture of celluloid will be found very convenient for the treatment of the mixture. This operation may be carried out in various manners. For example, the plastic mass of nitrocellulose is charged into a laminating-roller and after having been treated for thirty to forty minutes the casein is incorporated little by little, or the casein mass may be placed first in the laminating-roller, and after it has become nearly homogeneous the nitrocellulose mass is added to it. If desired, however, the two substances may be simultaneously placed in the laminator, or they may each be separately worked for a certain time and then mixed together in a third laminator. All three methods give good results. The plastic mass of casein saturated with alcohol or other solvent of nitrocellulose mixes in this condition in a perfect manner with the nitrocellulose mass and the mass becomes perfectly homogeneous after having been treated for a certain time. As the cylinders of the laminator are heated the mass becomes gradually more and more consistent, as the solvents evaporate, and after a treatment varying from three to four hours a transparent or translucent homogenous mass is formed. This mass is laminated in sheets of five to ten millimeters thickness, and a certain number of sheets are compressed while heated in a hydraulic press similar to those employed in the manufacture of celluloid. These sheets adhere together and form a block, which is then cut into pieces of the required thickness in the manner usually adopted in the manufacture of celluloid. Coloring-matter, whether mineral or organic, may be readily incorporated with the mass during the treatment in the laminating-rollers, and this permits of obtaining all the tints and any mixtures of tints it may be desired to produce.

The proportions of nitrocellulose and casein may vary according to the results to be obtained, the quality, and cost price of manufacture. Thus a mixture of one hundred parts of casein to two hundred of nitrocellulose will give a product entirely equivalent to ordinary celluloid. A mixture of one hundred parts of casein to one hundred of nitrocellulose gives a slightly-yellow product, but having all the qualities of ordinary celluloid and being cheaper. Lastly, if it is desired to obtain a very cheap product two hundred to three hundred parts of casein may be mixed with one hundred of nitrocellulose and this mixture gives a product adapted to replace ordinary celluloid in most of its applications and at a much lower cost of manufacture.

The celluloid employed in my improved process may be ordinary celluloid prepared with camphor.

Having thus described my invention, I claim—

1. The herein-described process of producing a homogeneous compound of nitrocellulose and casein, which consists in forming a plastic mass of the casein in one of its solvents, the latter being an aqueous solution, replacing the water, in part, from the said plastic mass with a liquid solvent of nitrocellulose, then removing the excess of liquid from the plastic mass, and finally incorporating with the mass of casein a mass of plastic nitrocellulose and kneading the same to form a homogeneous compound.

2. The herein-described method of producing a homogeneous compound of nitrocellulose and casein, which consists in forming a plastic mass of the casein with an aqueous solution of borax, then removing the surplus water, then immersing the mass in alcohol to displace a part of the water absorbed by the casein, then removing the excess of liquid from the mass, then incorporating the mass of casein thus prepared with a mass of plastic nitrocellulose and kneading the whole into a homogeneous compound.

3. The homogeneous compound of nitrocellulose and prepared casein above described.

In witness whereof I have hereunto signed my name, this 24th day of January, 1902, in the presence of two subscribing witnesses.

CHARLES BERNADAC.

Witnesses:
MARUL ARMENGAUD,
EDWARD P. MACLEAN.